United States Patent
Beach et al.

(10) Patent No.: US 8,310,357 B2
(45) Date of Patent: Nov. 13, 2012

(54) AFTER MARKET SEQUENTIAL TURN SIGNAL

(76) Inventors: Donald J. Beach, Seminole, FL (US); Edmund C. Wiggins, St. Petersburg, FL (US)

(*) Notice: Subject to any disclaimer, the term of this patent is extended or adjusted under 35 U.S.C. 154(b) by 268 days.

(21) Appl. No.: 12/844,269

(22) Filed: Jul. 27, 2010

(65) Prior Publication Data
US 2012/0025970 A1    Feb. 2, 2012

(51) Int. Cl.
*B60Q 1/34*    (2006.01)
(52) U.S. Cl. ... 340/475; 340/478; 340/468; 340/426.18; 340/479; 362/473
(58) Field of Classification Search ............... 340/475, 340/478, 468, 426.18, 479; 362/473, 541, 362/540, 495, 494, 485
See application file for complete search history.

(56) References Cited

U.S. PATENT DOCUMENTS

| | | | |
|---|---|---|---|
| 3,593,276 A | | 7/1971 | Schuler et al. |
| 5,790,017 A | * | 8/1998 | Berryhill ................. 340/475 |
| 6,025,775 A | * | 2/2000 | Erlandson ................. 340/436 |
| 2004/0227628 A1 | * | 11/2004 | Burdick ................. 340/479 |
| 2005/0134448 A1 | * | 6/2005 | Perlman et al. ............... 340/468 |
| 2006/0114108 A1 | | 6/2006 | Counts |
| 2009/0096601 A1 | * | 4/2009 | Gumbel et al. ............... 340/471 |
| 2009/0190366 A1 | * | 7/2009 | Weitzel ................. 362/473 |
| 2011/0291476 A1 | * | 12/2011 | Pribula et al. ................ 307/10.8 |

* cited by examiner

*Primary Examiner* — Hoi Lau
(74) *Attorney, Agent, or Firm* — Larson & Larson, P.A.; Frank Liebenow; Justin Miller

(57) ABSTRACT

A signal lamp control system for one rear side of a vehicle receives a signal or voltage from the vehicle (near side signal) originally intended to turn on all signal lamps on that side. Responsive to that signal, the signal lamp control system either turns on all signal lamps on that side or sequentially turns on the signal lamps on that side, depending on a status of a signal or voltage from the vehicle (far side signal) originally intended to control the signal lamps on the opposite rear side of the vehicle. In some embodiments, the signal lamp control system has knowledge of the state of the other side before the near side signal transitions on. This distinguishes between near-side signal activation (alone), brake activation, brake activation with near-side signal activation and hazard warning activation.

19 Claims, 8 Drawing Sheets

AFTER MARKET SEQUENTIAL TURN SIGNAL

FIELD

This invention relates to the field of vehicles and more particularly to a system for converting non-sequential rear signal lamps of a vehicle or automobile into sequential rear signal lamps.

BACKGROUND

There are several vehicles, in particular automobiles, which have multiple, side-by-side rear signal lamps that indicate when the vehicle is stopping and/or when the vehicle is turning. In some newer automobiles, the signal lamps are independently controlled and, when used to signal turning, the signal lamps are sequentially controlled. For example, when the driver activates their right turn signal, the inner most right signal lamp is illuminated, then the right inner most signal lamp and the right middle signal lamp are illuminated, then all three signal lamps are illuminated, and then they all are shut off. This is repeated until the turn signal is canceled.

There are many existing vehicles that have multiple rear signal lamps that were manufactured without sequential turn signals. For example, the 2005-2009 Ford Mustang and 1963 Chevy Impala have three signal lamps on each rear side for indicating turning and stopping to other motorists. Although, some vehicles are factory equipped with sequential turn signals, many existing vehicles do not have sequential turn signals, even though there are two or more signal lamps on each side of the vehicle.

To overcome this, after market products have been produced that provide the sequential feature for vehicles that have multiple signal lamps, but without factory provided sequential capability. These aftermarket products generally consist of a new wiring harness, lamp sockets, lamps and an electronic control, one for each side of the vehicle. When 12 VDC is provided to the control, it sequentially illuminates each of the signal lamps. This control functions well for turn signaling, but there may be a safety issue when signaling braking, being that these control functions cannot differentiate between turn signaling, hazard warning signal and brake signaling. Therefore, even when the brakes are activated, the signal lamps illuminate sequentially using these controls.

When a vehicle is stopping, it is crucial to clearly indicate such to vehicles traveling behind it. When the brakes are activated in vehicles having the aforementioned sequential signal lamp control systems, the sequential operation initially reduces the visibility of the brake signal lamp (only one signal lamps is illuminated instead of two or three and it is typically a central signal lamp). In many situations, it is important to drivers following the vehicle to react quickly to the vehicle stopping and, any delay in response is a potential for an accident.

Statute and codes of many states include laws that require all signal lamps to be illuminated when the brakes are activated, or at the minimum, require visibility to, for example, at least 300 feet in bright sunshine. Vehicles that are originally manufactured to meet these requirements when all three signal lamps are illuminated, may not meet these requirements when only one signal lamp is illuminated.

What is needed is an after market turn signal system that illuminates all signal lamps when braking and correctly illuminates multiple signal lamps sequentially when using turn signals.

SUMMARY

An improved signal lamp control system for one rear side of a vehicle receives a signal or voltage from the vehicle (near side signal) originally intended to turn on all signal lamps on that side. Responsive to that signal, the signal lamp control system either illuminates all signal lamps on that side of the vehicle or sequentially illuminates the signal lamps on that side of the vehicle, depending on the status of a signal or voltage from the vehicle (far side signal) originally intended to turn on all of the signal lamps on the opposite rear side of the vehicle.

In one embodiment, an after market turn signal system for controlling signal lamps of a near side of a vehicle is disclosed. There are at least two signal lamps on a near side of the vehicle. The turn signal system includes a circuit that detects a near side signal. The near side signal is generated by the vehicle to control the signal lamps on the near side of the vehicle (e.g. when the brake is activated, hazard warning signal is activated or the turn signal for that side of the vehicle is activated). Another circuit detects a far side signal. The far side signal generated by the vehicle to control signal lamps on a far side of the vehicle (those on the opposite side of the vehicle). A third circuit controls the signal lamps on the near side. The third circuit illuminates all of the signal lamps on the near side responsive to both the near side and the far side signal going on (e.g. a voltage of 12 VDC is present) simultaneously (e.g. brake is activated or hazard warning signal is activated) and the third circuit sequentially illuminates the signal lamps on the near side responsive to the near side signal going on while the far side signal does not go on simultaneously (e.g. turn signal is activated).

In another embodiment, a method of controlling signal lamps is disclosed. The signal lamps include at least two lamps (e.g. incandescent bulbs, LEDs or sets of LEDs) on each side of a vehicle. The vehicle emits a near side signal to turn on near side signal lamps and the vehicle emits a far side signal to turn on far side signal lamps. The method includes (a) clearing a far-side-last register then (b) shutting off all of the near side signal lamps. (c) If the far side signal is now off (e.g. logic zero, less than a voltage threshold, etc), the far-side-last register is cleared. (d) If the near side signal is off, steps (b)-(d) are repeated. Otherwise, (e) all of the near side signal lamps are illuminated and (f) a skew time interval is allowed to account for signal bounce and skewing. (g) If the far side signal is off or if the far-side-last register is set, (h) all near side signal lamps are shut off except for a first signal lamp of the near side signal lamps and (i) a sequence delay interval is taken; then (j) a second signal lamp of the near side signal lamps is illuminated. Now, (k) if the near side signal is on (e.g. logic one, approximately 12V, etc), step (k) is repeated. Once the near side signal transitions to off, (l) a skew time interval delay is taken, (m) the far-side-last register is set to the current value of the far side signal and (n) steps (a) to (n) are repeated.

In another embodiment, a method of controlling signal lamps is disclosed. The signal lamps include at least two lamps (e.g. incandescent bulbs, LEDs or sets of LEDs) on each side of a vehicle. The vehicle emits a near side signal to turn on near side signal lamps and the vehicle emits a far side signal to turn on far side signal lamps. The method includes (a) responsive to the near side signal from the vehicle transitioning on within a skew time interval (e.g. 20 milliseconds) of the far side signal transitioning on, all signal lamps of the near side signal lamps are illuminated (e.g. braking or hazard warning is activated). (b) responsive to the near side signal from the vehicle transitioning to on when the far side signal has not transitioned to on within the skew time interval, (c) a first signal lamp of the near side signal lamps is illuminated, then a (d) sequence delay interval is taken, and then (e) a second signal lamp of the near side signal lamps is illuminated (sequential turn signal illumination).

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
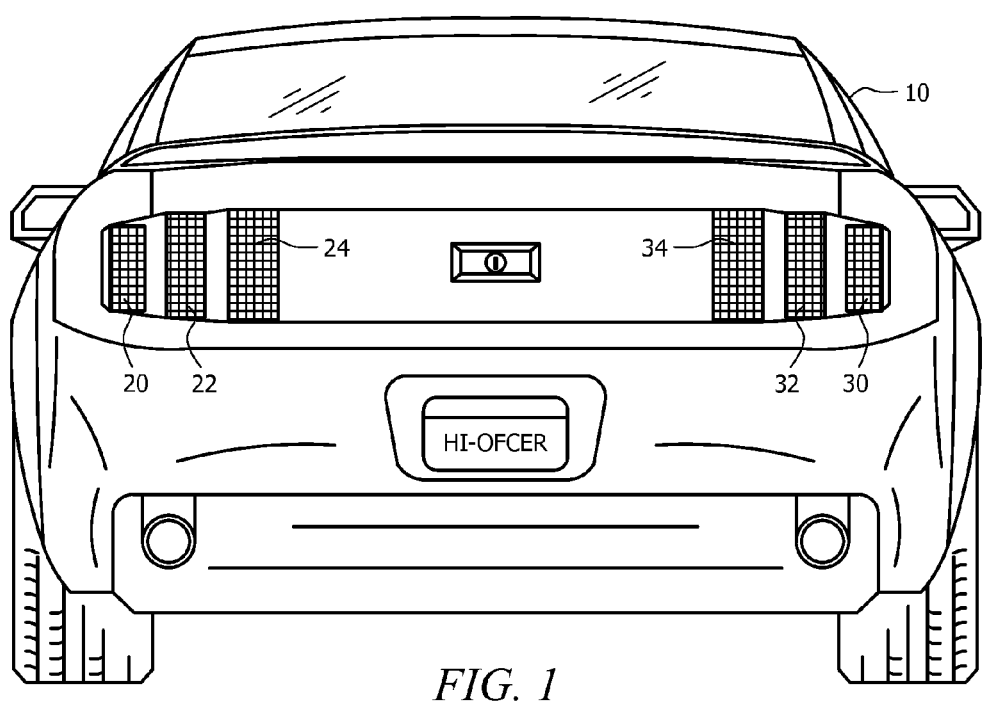
FIG. 1 illustrates a rear view of a vehicle having multiple signal lamps indicating stopping, turning and hazard warning.

Reference will now be made in detail to the presently preferred embodiments of the invention, examples of which are illustrated in the accompanying drawings. Throughout the following detailed description, the same reference numerals refer to the same elements in all figures.

Throughout this description, the term "signal lamp" refers to a lamp (incandescent bulb, LED, LEDs, etc) that is illuminated to indicate that a vehicle is about to make a turn and/or stop and/or hazard warning. The term "illuminate" generally means that power is applied to a device such as a lamp, bulb, LED, etc, and the device emits light. The signal levels "on" and "off" used to describe the near side signal (NS) and the far side signal (FS) form a binary positive logic system where "on" (logic 1) is represented by a voltage near the vehicle battery voltage (typically referred to as 12 VDC) and "off" (logic 0) is represented by a lower voltage near the vehicle ground potential (typically referred to as 0 VDC).

Although the vehicle is generally designed to provide considerable power via the near side signal (NS) and far side signal (FS) when "on", the signal voltage will generally be at a lower potential than the vehicle battery voltage due to drops in the wiring and switching circuits. When the near side (NS) and far side (FS) signals are "off", they are usually not driven low by the vehicle switching circuits. Rather, the switching circuits enter a high-impedance state that allows the loads connected to the near side (NS) and far side (FS) signals to pull them near to the vehicle ground potential.

Referring to FIG. 1, a rear view of a vehicle having multiple signal lamps is shown. This vehicle 10 has three left signal lamps 20/22/24 and three right signal lamps 30/32/34. All signal lamps 20/22/24/30/32/34 are illuminated when the brakes are in use and no turn signal is active. When the left turn signal is active and the brakes are activated, all of the right signal lamps 30/32/34 are illuminated and the left signal lamps 20/22/24 are sequentially illuminated, for example, the inner signal lamp 24 is illuminated, then the inner signal lamp 24 and center signal lamp 22 are illuminated, then the inner signal lamp 24, center signal lamp 22 and outer signal lamp 20 are illuminated, then the left side signal lamps 20/22/24 are turned off. This sequential cycle will continue until the left turn signal is cancelled.

When the right turn signal is active and the brakes are activated, all left signal lamps 20/22/24 are illuminated and the right signal lamps 30/32/34 are sequentially illuminated, for example, the inner signal lamp 34 is illuminated, then the inner signal lamp 34 and center signal lamp 32 are illuminated, then the inner signal lamp 34, center signal lamp 32 and outer signal lamp 30 are illuminated, then all of the right side signal lamps 30/32/34 are turned off. This sequential cycle will continue until the right turn signal is cancelled.

When the left turn signal is active and the brakes are not active, all right signal lamps 30/32/34 are not illuminated and the left signal lamps 20/22/24 are sequentially illuminated, for example, the inner signal lamp 24 is illuminated, then the inner signal lamp 24 and center signal lamp 22 are illuminated, then the inner signal lamp 24, center signal lamp 22 and outer signal lamp 20 are illuminated, then all signal lamps are turned off. This sequential cycle will continue until the left turn signal is cancelled. When the right turn signal is active and the brakes are not active, all left signal lamps 20/22/24 are not illuminated and the right signal lamps 30/32/34 are sequentially illuminated, for example, the inner signal lamp 34 is illuminated, then the inner signal lamp 34 and center signal lamp 32 are illuminated, then the inner signal lamp 34, center signal lamp 32 and outer signal lamp 30 are illuminated, then all signal lamps are turned off. This sequential cycle will continue until the right turn signal is cancelled.

Figure 2:
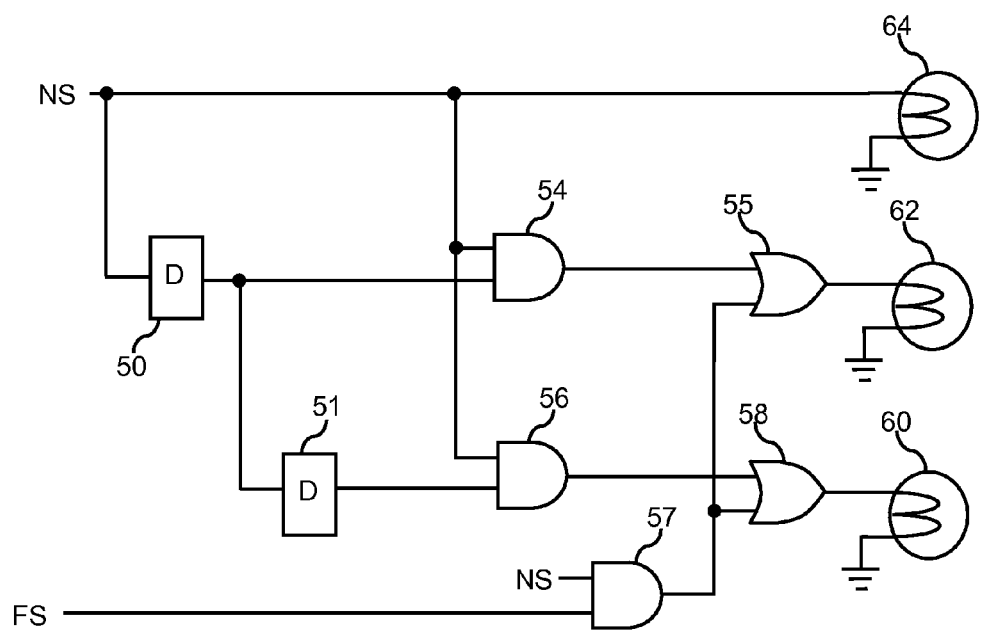
FIG. 2 illustrates a schematic of the first example of a single side of a sequential turn signal system.

Referring to FIG. 2, a schematic of the first embodiment of a single side of a sequential turn signal system is shown. This solution provides sequential turn signals when not braking. In this example, the circuit has access to both the near side signal (NS) and the far side signal (FS) from the vehicle. Both the near side signal (NS) and far side signal (FS) are on during braking. During near side turn signaling, the near side signal (NS) alternates on and off and the far side signal (FS) is either on (if the brake is activated) or off (if the brake is not activated). Typically, the period is one second (0.5 seconds on and 0.5 seconds off). Most motor vehicle codes require between 60 and 120 flashes per minute with a 40% to 60% duty cycle, for example the Federal Motor Vehicle Standard 571.108, which refers to SAE J590B, Performance Standard for Flashers.

Although the signal lamps are shown as incandescent bulbs 60/62/64, any type of brake/turn signal lamp is anticipated including LEDs and arrays of LEDs.

When the near side signal (NS) transitions to on (e.g. 12 VDC), the first signal lamp 64 goes on immediately. If, at the same time, the far side signal (FS) is on (e.g. the brakes are activated), then both inputs to the two-input AND gate 57 are on, causing the output of the two-input AND gate 57 to go on, causing the lower inputs to the OR gates 55/58 to go on and, therefore, the second 62 and third 60 signal lamps are illuminated. It is anticipated that the OR gates 55/58 are diodes or any other logic known that performs this function.

When the near side signal (NS) transitions to on, the first signal lamp 64 illuminates immediately. If, at the same time, the far side signal (FS) is off (e.g. the brakes are not activated), then the lower input of the AND gate 57 is off and the output of the AND gate 57 is off and the lower inputs to the OR gates 55/58 are off and, therefore, the second 62 and third 60 signal lamps are illuminated dependent on the outputs of the AND gates 54/56. Initially, both outputs of the delay circuits 50/51 are off and, therefore, the lower inputs of the AND gates 54/56 are off, causing the outputs of the AND gates 54/56 to be off and, the top inputs of the OR gates 55/58 to be off and the signal lamps 60/62 are not illuminated. After a sequence delay interval following the near side signal (NS) transition to on, the output of the first delay 50 goes on. Responsive to this, both inputs of the first AND gate 54 are on and, consequently, the output of the first AND gate 54 goes on and causes the upper input of the OR gate 55 to go on, illuminating the center signal lamp 62. The output of the first delay 50 starts the second delay 51 and after the second delay (sequence delay interval); the output of the second delay 51 transitions to on. Responsive to this, both inputs of the second AND gate 56 are on and, consequently, the output of the second AND gate 56 goes on and causes the upper input of the OR gate 58 to go on, illuminating the third signal lamp 60 (e.g. outer signal lamp). When the near side signal (NS) transitions to off (e.g. after 0.5 seconds during flashing) the upper inputs to the AND gates 54/56 go low, the delays 50/51 are immediately reset, causing the lower inputs of the first and second AND gates 54/56 to go off, causing the outputs of the AND gates 54/56 and the upper inputs of the OR gates 55/58 to go off and all signal lamps turn off.

The sequence delays 50/51 are selected so that the second turn signal lamp 62 illuminates for approximately ⅔ of the turn signaling on-interval and the third turn signal lamp 60 illuminates for approximately ⅓ of the turn signaling on-interval. For example, if the turn signaling period is one second and the turn signaling on-interval is 0.5 seconds, then both sequence delays 50/51 are 0.33*0.5 seconds, or 0.165 seconds. In some embodiments, the sequence delays are adjustable. In systems with two signal lamps per side, there is only one sequencing delay 50 and it is approximately ½ of turn signaling on-interval, or for a one second turn signal period, the sequence delay is 0.25 seconds.

Figure 3:
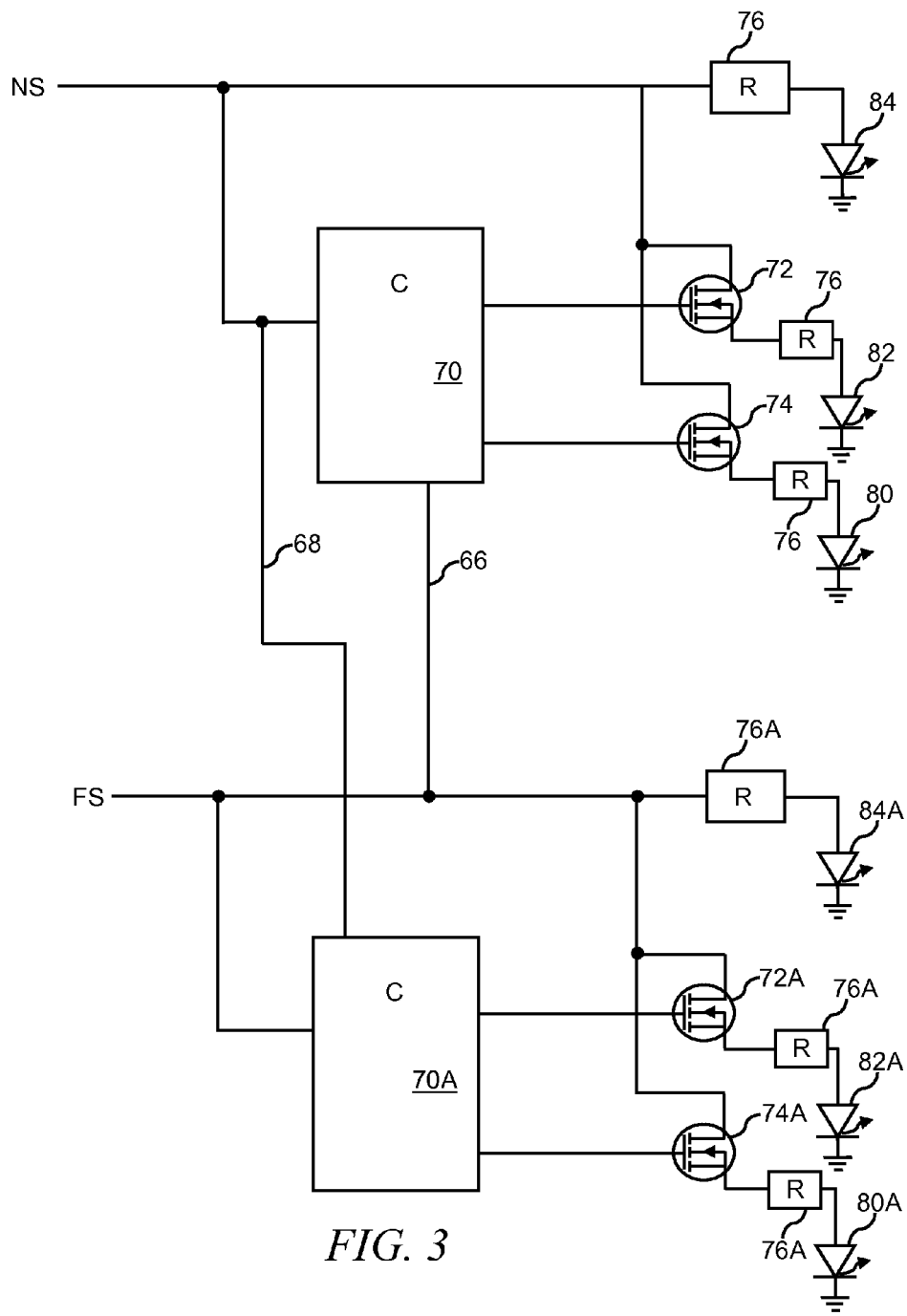
FIG. 3 illustrates a schematic of the second example of a sequential turn signal system showing three signal lamps (LEDs).

Referring to FIG. 3, a schematic of the second example of a sequential turn signal system showing three signal lamps (LEDs) per side is shown. This example uses LEDs (or arrays of LEDs) 80/82/84/80A/82A/84A as exemplary signal lamps. The near side, and far side circuits each have a controller 70/70A and each controller operates in mirror fashion. The near side controller 70 determines the state of the far side signal (FS) by way of a communications link 66. The far side controller 70A determines the state of the near side signal (NS) by way of a communications link 68. Each controller 70/70A, being aware of the activities of the opposite side, controls the second signal lamps 82/82A and third signal lamp 80/80A based upon its own signal and the status of the opposite side signal. In this way, each controller, knowing the status of the opposite side signal, determines whether braking is being performed and/or a turn signal operation is being performed. For example, when the near side signal (NS) transitions to on, the first signal lamp 84 (e.g. inner signal lamp) is illuminated and the near side controller 70 illuminates the second signal lamp 82 and third signal lamp 80, and then determines whether the far side signal (FS) is on. If FS is on (e.g. the brakes are activated), then the near side controller 70 leaves the second signal lamp 82 and third signal lamp 80 in the on state (illuminated). If the far side signal (FS) is off (e.g. a turn signal is in use), then the near side controller 70 immediately turns off the second signal lamp 82 and third signal lamp 80 before they are noticeable by human perception, delays for the sequence delay interval, turns on the second lamp 82, delays again for the sequence delay interval and turns on the third signal lamp 80. The far side controller operates in the same way.

Any configuration of LEDs 80/82/84/80A/82A/84A, current limiting resistors 76/76A and driver devices 72/74/72A/74A are anticipated. The devices shown are examples. Any form of cross communication links 66/68 is anticipated including using wire, fiber optics, opto-isolators, level sensors and the like.

By including extra logic (in addition to that of FIG. 2) or software in each controller 70/70A, a further enhancement to the operation is obtained in which, sequential operation of the turn signal lamps is performed when the brakes are active and the turn signal is also active. Given the logic of FIG. 2, when the brakes are applied, all signal lamps 60/62/64 are illuminated. When the brakes are on and, for example, the near turn signal is operated, the far side signal (FS) remains on (far signal lamps stay on) and the near side signal (NS) alternates between on and off. The first signal lamp 64 receives the near signal (NS) directly and follows such, illuminating responsive to the near side signal (NS) transitioning to on. The logic of FIG. 2, by way of the AND gate 57 and the OR gates 55/58, causes the second signal lamp 62 and signal third signal lamp 60 to also flash in synchronization with the near side signal (NS). In such, the far side signal lamps stay on while the near side signal lamps 60/62/64 all illuminate in unison. This operation is fine and meets safety codes, but it is still desirable to sequentially flash, even during braking.

To operate correctly, the turn signal system needs to determine whether the near side signal (NS) has transitioned to on simultaneously with the far side signal (FS) transitioning to on. The near side signal (NS) transitions simultaneously with the far side signal (FS) when braking is activated and when hazard warning is activated. Being that the near side signal (NS) and the far side signal (FS) are generated by the vehicle electronics, there is no guarantee that both will transition at exactly the same time, therefore, "simultaneously" includes a skew time interval to allow for possible skewing, for example 20 milliseconds. From the human eye, the signals appear to be simultaneous.

To provide the sequential flashing operation during braking, the software in each controller 70/70A determines whether the far side signal (FS) was on substantially before (e.g. 20 milliseconds before or at the last transition to off of the near side signal) the near side signal (NS) transitioned to on. During braking or hazard warning signaling, both the near side signal (NS) and the far side signal (FS) transition to on and transition to off at substantially the same time, but during turn signaling while braking, the far side signal (FS) is on before the near side signal (NS) transitions to on. Therefore, the controllers 70/70A each monitor the far side signal (FS) and, if the far side signal (FS) was on, for example, 20 milliseconds before the near side signal (NS) transitioned to on or 20 milliseconds (skew time interval) after the near side signal (NS) last transitioned to off, the controller 70/70A determines that signaling while braking has occurred and when the near side signal (NS) transitions to on, illuminates the second signal lamp 82 after a first sequence delay and illuminates the third signal lamp 80 after a second sequence delay. It has been determined that a skew time interval of 20 milliseconds works well in many vehicles for eliminating false operations due to skewing, noise or signal bounce.

Figure 4:
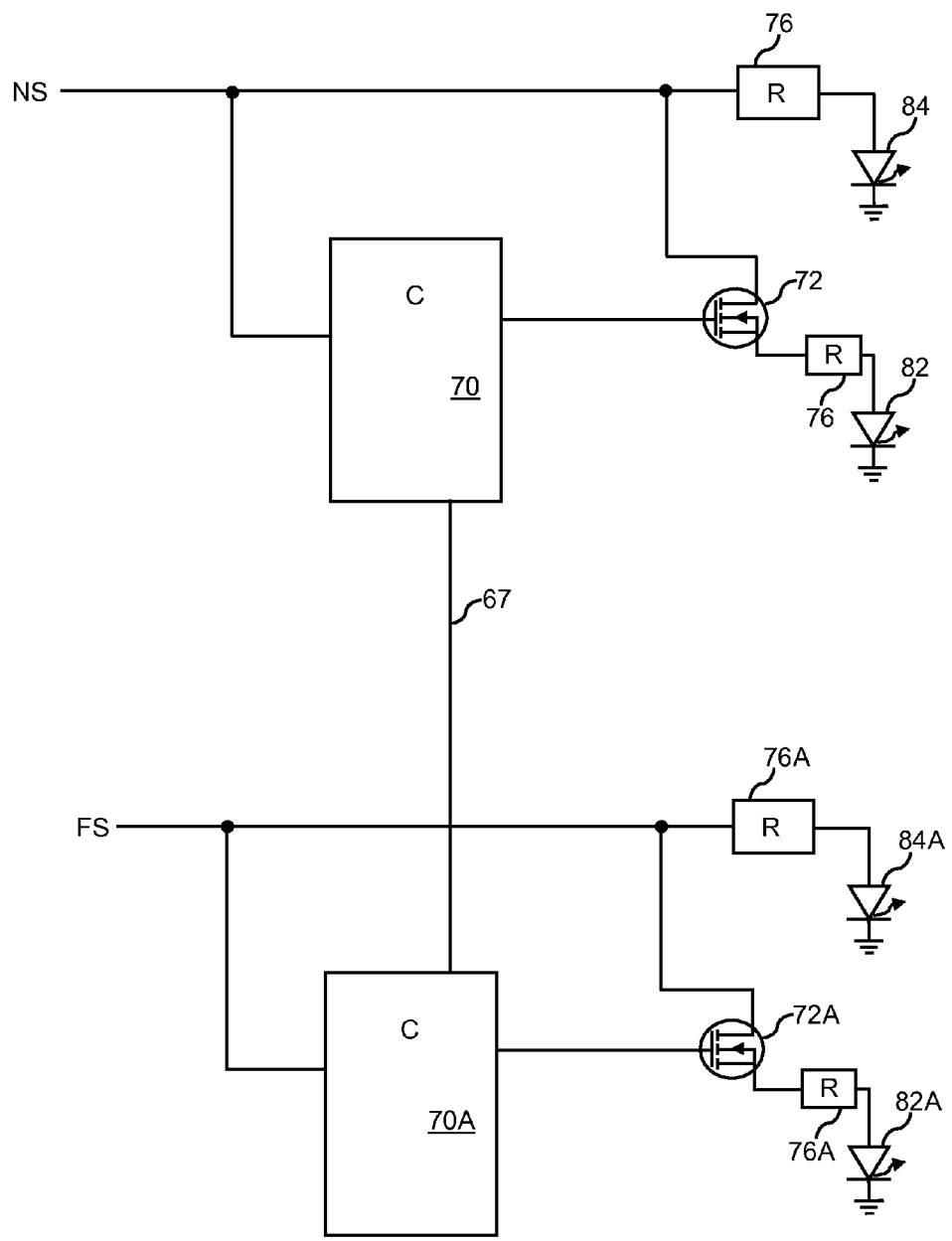
FIG. 4 illustrates a schematic of the second example of a sequential turn signal system showing two signal lamps (LEDs).

Referring to FIG. 4, a schematic of the second example of a sequential turn signal system having two signal lamps (LEDs) is shown. This example uses LEDs (or arrays of LEDs) 82/84/82A/84A as signal lamps. The near side (NS) and far side (FS) circuits each have a controller 70/70A and each controller operates in mirror fashion. The controllers 70/70A determine the state of the opposing controllers 70A/70 by way of a bi-directional communications link 67. The near side controller 70 determines the state of the far side signal (FS) by way of the bi-directional communications link 67 and vice-versa. Each controller 70/70A, being aware of the activities of the opposite side, controls the second signal lamp 82/82A based upon its own near side signal (NS) and the status of the opposite side signal, FS. In this way, each controller, knowing the status of the opposite side signal, determines whether braking is active, a turn signal is active, or both. For example, when NS transitions to on, the first signal lamp 84 (e.g. inner signal lamp) is illuminated and the near side controller 70 illuminates the second signal lamp 82 then determines whether FS is on. If the far side signal (FS) is on (e.g. the brake signal lamps are on), then the near side controller 70 leaves the second signal lamp 82 in the on state (illuminated). If FS is off (e.g. a turn signal is in use), then the near side controller 70 turns off the second signal lamp 82, delays for a sequence delay interval, then turns on (illuminates) the second signal lamp 82. The far side controller operates in the same way.

Any configuration of LEDs 82/84/82A/84A, current limiting resistors 76/76A and driver devices 72/72A/74/74A are anticipated. The devices shown are examples. Any form of communication link 67 is anticipated including level or current values and the like.

To provide sequential operation during braking, the software in each controller 70/70A determines whether the far side signal (FS) was on before the near side signal (NS) transitioned to on or the far side signal (FS) was on when the near side signal (NS) last transitioned to off. During braking or hazard warning signaling, both the near side signal (NS) and the far side signal (FS) transition to on and transition to off at substantially the same time (e.g. within a skew time interval of 20 milliseconds, etc), but during signaling while braking, the far side signal (FS) is on before the near side signal (NS) transitions to on. Therefore, the controllers 70/70A each monitor the far side signal (FS) and, if the far side signal (FS) was on, for example, 20 milliseconds before the near side signal (NS) transitions to on or 20 milliseconds (skew time interval) after the near side signal (NS) last transitioned to off, the controller 70/70A determines that signaling while braking has occurred and illuminates the second signal lamp 82/82A after a sequence delay. It has been determined that a skew time interval of 20 milliseconds works well in many vehicles for eliminating false operations due to skewing, noise or signal bounce.

Figure 5:
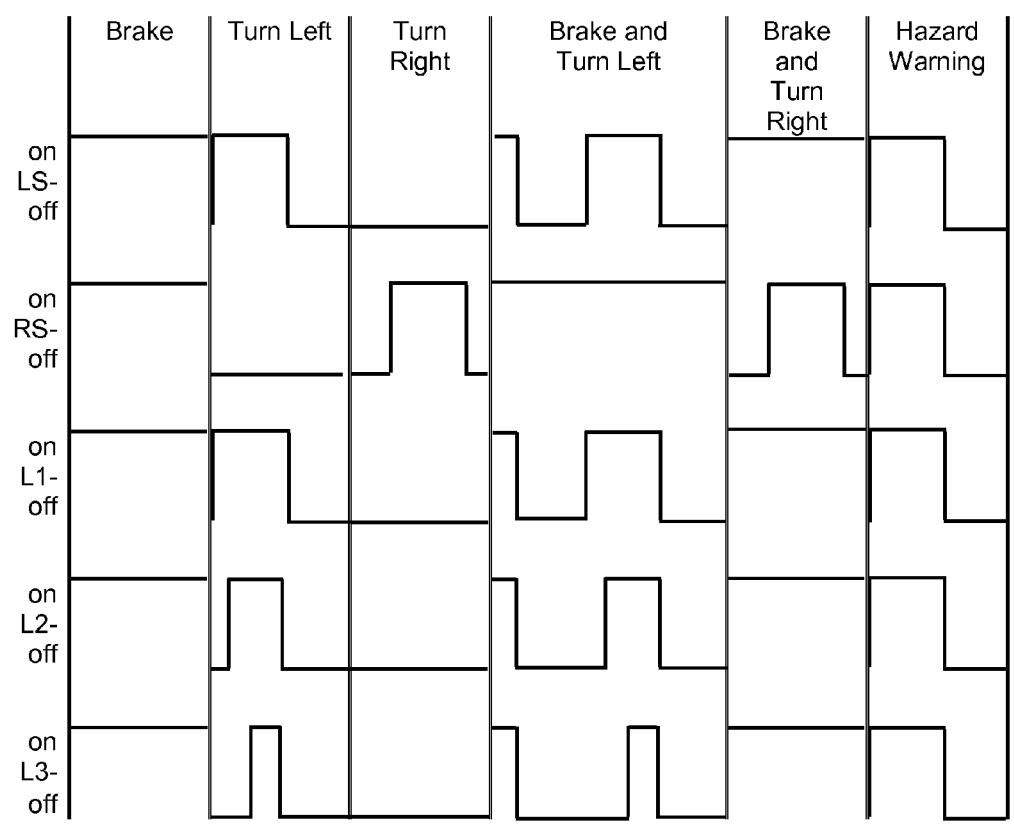
FIG. 5 illustrates a timing diagram.

Referring to FIG. 5, a timing diagram is shown. When the brakes are activated, the left signal, LS, and right signal, RS, are on and the near side signal lamps, L1, L2 and L3 are illuminated. When only the left turn signal is activated, the left signal (LS) transitions on and off at approximately ½ second intervals while the right signal (RS) remains off and, therefore, L1 turns on with the left signal, L2 turns on after a sequence delay interval and L3 turns on after another sequence delay interval, then L1, L2 and L3 turn off when the left signal (LS) turns off. When only the right turn signal is activated, the right signal (RS) transitions off and on at approximately ½ second intervals while the left signal (LS) remains off. Therefore, L1, L2 and L3 remain off.

When the left turn signal is activated while the brake is also activated, the left signal (LS) transitions on and off at approximately ½ second intervals while the right signal (RS) remains on and, therefore, L1 turns on with the left signal (LS), L2 turns on after a sequence delay interval and L3 turns on after another sequence delay, then L1, L2 and L3 turn off when the left signal (LS) turns off. When the right turn signal is activated while braking, the right signal (RS) transitions on and off at approximately ½ second intervals while the left signal (RS) remains on. Therefore, L1, L2 and L3 are all on.

During hazard warning signaling, both the left signal (LS) and right signal (RS) transition on and off at the same time at approximately ½ second intervals. Since both the left signal (LS) and right signal (RS) transition at the same time (within a skew time interval), when they are both on, the logic works as if the brakes have been activated and L1, L2, L3 are illuminated when both the left signal (LS) and right signal (RS) go on and L1, L2, L3 go off when both the left signal (LS) and right signal (RS) go off.

Figure 6:
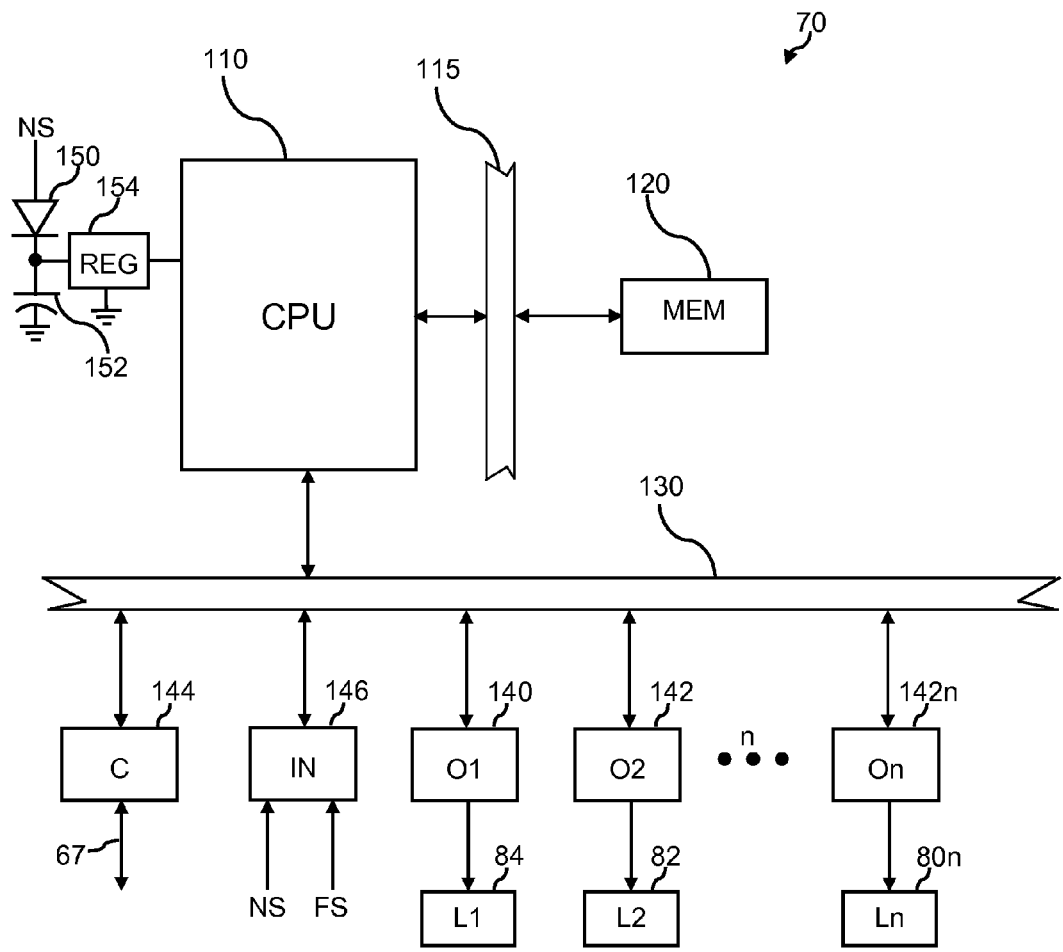
FIG. 6 illustrates a schematic view of a typical controller processor.

Referring to FIG. 6, a schematic view of a typical controller processor 70 is shown. The example computer/controller 70 represents a typical programmable controller 70 (also 70A). Many different computer architectures are known that accomplish similar results in a similar fashion and the present invention is not limited in any way to any particular processor, controller, programmable device, etc. In the example shown, a processor 110 is provided to execute stored programs that are generally stored within a memory 120. The processor 110 is any processor such as an 80C51, etc. The memory 120 is typically connected to the processor by a memory bus 115 and is any memory 120 suitable for connection with the selected processor 110, such as any combination of one or more of SRAM, DRAM, SDRAM, RDRAM, DDR, DDR-2, ROM, FLASH, EPROM, FRAM etc.

Also connected to the processor 110 is a system bus 130 for connecting to input output ports. In this example, there are three output ports. An output port 140 controls a first signal lamp 84 and a second output port 142 controls a second signal lamp 82. Additional output ports 142n are anticipated to control as many (n) signal lamps 80n as required. An input port 146 monitors the state of the near side signal (NS). For embodiments in which the near side controller 70 and the far side controller 70A exchange state information, an input/output port 144 connects the near side controller 70 and the far side controller 70A over a communications link 67. For embodiments in which the near side controller 70 monitors the state of the far side signal (FS), the input port 146 also monitors the state of the far side signal (FS).

In order to determine if the turn signal is active while the brakes are active, the near side controller needs to determine whether the far side signal (FS) was on during the off-interval of the near side turn signal (NS). If the far side signal (FS) is on but was off more than a predetermined time (skew time interval) preceding the on-transition of the near side signal (NS), then it is determined that the current operation is not sequential turn signaling (e.g. the brakes or hazard warning were activated). If the far side signal (FS) is on and was on more than a predetermined time (skew time interval) preceding the on-transition of the near side signal (NS), then it is determined that the current operation is sequential turn signaling during braking. If the far side signal (FS) is off and the near side signal (NS) is on, then it is determined that the current operation is sequential turn signaling alone.

In the preferred embodiment, the controller 70/70A is powered directly by the near side signal (NS). The first time that the near side signal (NS) transitions to on (e.g. 12V), the controller receives power and initializes. During near-side turn signaling and hazard warning, the near side signal (NS) is typically on for approximately ½ second and off for approximately ½ second. Since, it is desired to monitor the far side signal (FS) to determine if it is transitioning at substantially the same point in time as the near side signal (NS) (e.g. within the skew time interval), in the preferred embodiment, a circuit is provided to keep the controller 70/70A operational at least until the next positive transition of the near side signal (NS). To accomplish such, an energy storage device, as known in the industry, is provided, storing enough power as to operate the controller 70/70A for at least the off interval of the near side signal (NS). An example of such is shown in FIG. 6. A diode 150 charges a capacitor 152 when the near side signal (NS) is on (e.g. 12V). The controller 70/70A is powered by a regulator 154 that receives power from the capacitor 152. The capacitor retains sufficient charge as to run the controller 70/70A during the off-time of the near side signal (NS) during turn signaling. In other embodiments, it is anticipated that the controllers 70/70A are powered while the vehicle is operational.

Figure 7:
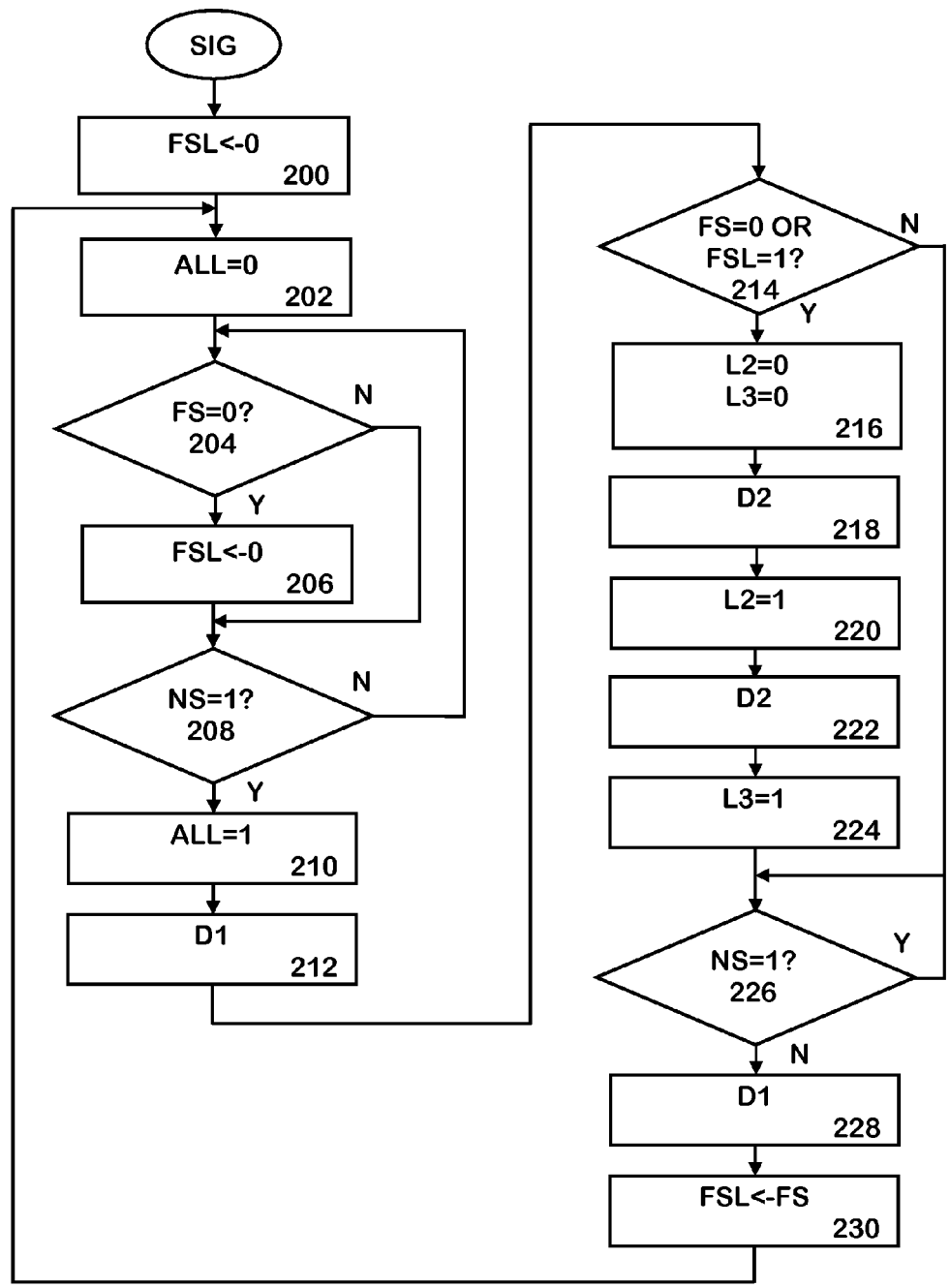
FIG. 7 illustrates an exemplary flow chart executed by the typical controller processor.

Referring to FIG. 7, an exemplary flow chart executed by the typical controller processor 110 will be described. The method starts with clearing 200 a registered, FSL (far side last value). Next, all near side signal lamps (L1-L3) are shut off (not illuminated) 202. A loop begins with testing the far side signal (FS) 204 and if the far side signal (FS) is off 204, the far side last register is cleared 206. Next, the near side signal (NS) is tested and if the near side signal (NS) is not on (not NS=1?) 208, the above steps 204/206/208 are repeated. Once the near side signal (NS) goes on 208, all near side signal lamps L1-L3 are illuminated (at least temporarily) 210 and a skew time interval delay begins 212. The skew time interval is typically around 20 milliseconds to eliminate the effect of skewing between the near side signal (NS) and the far side signal (FS) and/or signal noise/bounce. For example, during braking or hazard warning, it is possible for the near side signal (NS) to arrive slightly before the far side signal (FS) due to vehicle electrical timing.

After the skew time interval, a test 214 is made to determine if the far side signal (FS) is off (FS=0) or if the far side last (FSL) is true (FSL=1) 208. If the far side signal (FS) is off (braking or hazard flashing are not active), turn signaling of the near side alone being performed and the signal lamps are illuminated in sequence. If FSL was true (FSL=1), then it is determined that the far side signal (FS) was on substantially before the near side signal (NS) transitioned to on or the far side signal (FS) was on during the last transition to off of the near side signal (NS) or at some time between the two and the signal lamps L1-L3 are illuminated in sequence. This would occur if the brakes are activated and the near side signal (NS) is also activated.

If the far side signal (FS) is on (FS=1) and the far side last (FSL) is false (FSL=0) 214, it is determined that either hazard warning or braking is active and the near side signal lamps L1-L3 remain illuminated while the near side signal (NS) is tested 226 to determine if the near side signal (NS) remains on (NS=1?). Once the near side signal (NS) goes off (NS=0), an optional, though preferred skew time interval delay 228 is taken, for example 20 milliseconds, then the current value of the far side signal (FS) is copied 230 into the far side last register (FSL) and the previous steps 202-230 are repeated.

If the far side signal (FS) is off (FS=0) or if the far side last (FSL) is true (FSL=1) 214 (e.g. sequencing), the second signal lamp, L2, and the third signal lamp, L3, are turned off 216 (e.g. they were only on for the skew time interval, e.g. 20 ms, such that they would not be illuminated long enough to be detected by the human eye), a sequence delay interval is taken 218 (e.g. ⅙ of a second), then the second signal lamp, L2, is illuminated 220. Next, another sequence delay interval is taken 222 (e.g. ⅙ of a second) and then the third signal lamp, L3, is illuminated 224. It is preferred that the delays 218/222 are approximately ⅓ of the turn signal on-time for three lamps L1-L3. Therefore, the first signal lamp, L1, is on by itself for ⅓ of the turn signal on-time, the second signal lamp, L2, is on with the first signal lamp, L1, for ⅔ of the turn signal on-time and the third signal lamp, L2, is on with the first signal lamp, L1, and second signal lamp, L2, for ⅓ of the turn signal on-time. Other lighting sequences are anticipated such as sequencing from the third signal lamp to the first signal lamp (reverse order), turning on each signal lamp for only ⅓ of the sequence (or ½ of the sequence for two signal lamps), etc.

The near side signal lamps, L1-L3, remain illuminated while the near side signal (NS) is tested 226 to determine if the near side signal (NS) remains on (NS=1?). Once the near side signal (NS) goes off (NS=0), an optional, though preferred skew time interval delay 228 is taken, for example 20 milliseconds, then the current value of the far side signal (FS) is copied 230 into the far side last register (FSL) and the previous steps 202-230 are repeated.

Figure 8:
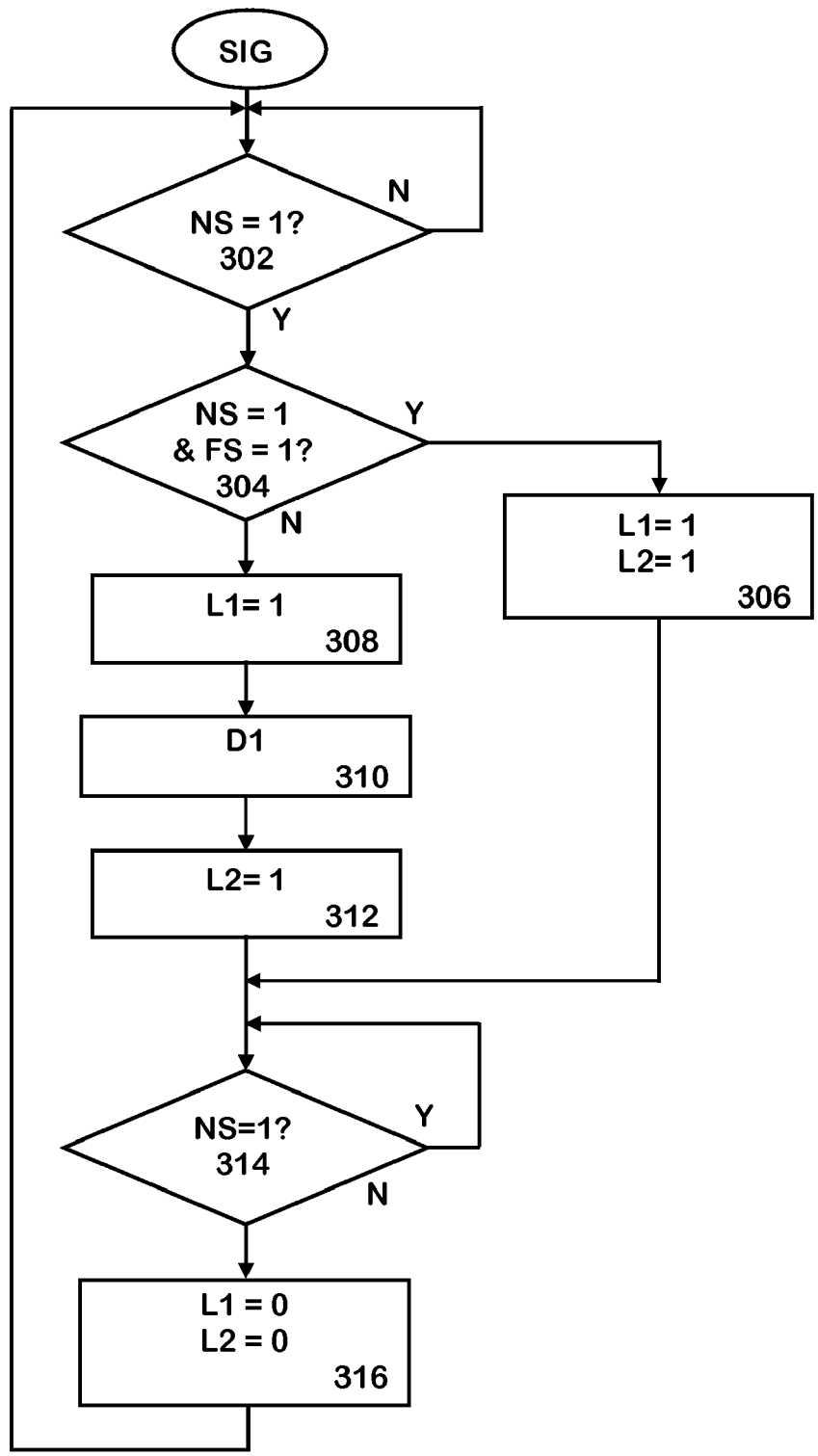
FIG. 8 illustrates a second exemplary flow chart executed by the typical controller processor.

Referring to FIG. 8, a second exemplary flow chart executed by the typical controller processor 110 will be described. The method starts with waiting for the near side signal (NS) to transition to on 302. Once the near side signal (NS) transitions to on, a test is made to determine if the near side signal (NS) and the far side signal (FS) transitioned simultaneously 304. Simultaneously, in this matter, is defined as transitioning within a skew time interval of, for example, a few milliseconds of each other (e.g. 20 milliseconds). This skew time interval provides for ignoring of skewing and/or bounce due to the electrical systems of the typical vehicle.

If the near side signal (NS) and the far side signal (FS) transitioned to on simultaneously 304 (e.g. braking activated or hazard signaling occurred), all near side signaling lamps (in this example two lamps) L1/L2 are illuminated 306 and stay illuminated until the near side signal (NS) transitions to off 314, at which time all near side signal lamps L1/L2 are turned off 316.

If the near side signal (NS) and the far side signal (FS) did not transition to on simultaneously 304 (e.g. near-side signaling occurred), a first near side signaling lamp L1 is illuminated 308 and then a sequence delay interval is taken 310. The sequence delay interval depends upon the number of near side signal lamps. In this example, there are two near side signal lamps, so the sequence delay interval is preferred to be approximately ½ of the turn signaling on-time, typically ¼ of a second (for three signal lamps the sequence delay interval is approximately ⅓ of the turn signaling on-time, typically ⅙ of a second). After the sequence delay interval, the second near side signal lamp (L2) is illuminated 312. The signal lamps stay illuminated until the near side signal (NS) transitions to off 314, at which time all near side signal lamps L1/L2 are turned off 316.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An after market turn signal system for controlling signal lamps on a near side of a vehicle, at least two of the signal lamps are on the near side of the vehicle, the turn signal system comprising:

means for detecting a near side signal, the near side signal generated by the vehicle to control the signal lamps on the near side of the vehicle;

means for detecting a far side signal, the far side signal generated by the vehicle to control signal lamps on a far side of the vehicle; and means for controlling the signal lamps on the near side, the means for controlling illuminates all of the signal lamps on the near side responsive to the near side signal going on within a skew time interval of the far side signal going on and the means for controlling sequentially illuminates the signal lamps on the near side responsive to the near side signal going on and the far side signal not going on within the skew time interval.

2. The after market turn signal system of claim 1, wherein the skew time interval is 20 milliseconds.

3. The after market turn signal system of claim 1, wherein the means for controlling includes a processor.

4. The after market turn signal system of claim 1, wherein the means for detecting the far side signal is a communications signal from a mirror after market turn signal system, the mirror after market turn signal system connected to and controls the signal lamps on the far side of the vehicle.

5. The after market turn signal system of claim 1, wherein there are three signal lamps on each side of the vehicle.

6. The after market turn signal system of claim 1, wherein a combined circuit controls both the near side signal lamps and far side signal lamps.

7. A method of controlling signal lamps, the vehicle emitting a near side signal to turn on near side signal lamps and the vehicle emitting a far side signal to turn on far side signal lamps, the method comprising:
(a) clearing a far-side-last register;
(b) shutting off all of the near side signal lamps;
(c) if the far side signal is off, clearing the far-side-last register;
(d) if the near side signal is off, repeating steps (b)-(d);
(e) illuminating all of the near side signal lamps;
(f) delaying for a skew time interval;
(g) if the far side signal is off or if the far-side-last register is set, performing steps (h) to (j):
(h) shutting off all near side signal lamps except for a first signal lamp of the near side signal lamps;
(i) delaying for a sequence delay interval;
(j) illuminating a second signal lamp of the near side signal lamps;
(k) if the near side signal is on, repeat step (k);
(l) delaying for another skew time interval;
(m) setting the far-side-last register to the current value of the far side signal; and
(n) repeating steps (b) to (n).

8. The method of claim 7, further comprising after step (j), the steps of:
(j') delaying for the sequence delay interval; and
(j") illuminating a third signal lamp of the near side signal lamps.

9. The method of claim 7, wherein the sequence delay interval is approximately one half of a turn signal on-time interval of the vehicle.

10. The method of claim 8, wherein the sequence delay interval is approximately one third of a turn signal on-time interval of the vehicle.

11. The method of claim 7, wherein the skew time interval is 20 milliseconds.

12. The method of claim 8, wherein the sequence delay interval is approximately ⅙ of a second.

13. A method of controlling signal lamps, the vehicle signaling a near side signal to turn on near side signal lamps and the vehicle emitting a far side signal to turn on far side signal lamps, the method comprising:
(a) responsive to the near side signal from the vehicle transitioning to on within a skew time interval of the far side signal transition to on, illuminating all signal lamps of the near side signal lamps;
(b) responsive to the near side signal from the vehicle transitioning to on when the far side signal has not transitioned to on within the skew time interval:
(c) illuminating a first signal lamp of the near side signal lamps;
(d) delaying for a sequence delay interval; and
(e) illuminating a second signal lamp of the near side signal lamps.

14. The method of claim 13, further comprising the steps of:
(f) delaying for the sequence delay interval; and
(g) illuminating a third signal lamp of the near side signal lamps.

15. The method of claim 13, wherein the sequence delay interval is approximately one half of a turn signal on-time interval of the vehicle.

16. The method of claim 14, wherein the sequence delay interval is approximately one third of a turn signal on-time interval of the vehicle.

17. The method of claim 13, wherein the skew time interval is 20 milliseconds.

18. The method of claim 13, wherein the sequence delay interval is approximately ¼ of a second.

19. The method of claim 14, wherein the sequence delay interval is approximately ⅙ of a second.

* * * * *